Patented May 4, 1937

2,079,325

UNITED STATES PATENT OFFICE 2,079,325

PROCESS FOR THE PREPARATION OF LACTONES

Arthur W. Larchar, Wilmington, Del., assignor to E. I. du Pont de Nemours & Company, Wilmington, Del., a corporation of Delaware No Drawing. Application March 30, 1935, Serial No. 13,907

8 Claims. (Cl. 260—123)

This invention relates to a catalytic process for the preparation of lactones and more particularly to the preparation of phthalide.

Phthalic anhydride has been hydrogenated over nickel catalysts by several investigators. Godchot (Bull. Soc. Chem. (4) 1, 829 (1907)) noted the production of phthalide when phthalic anhydride was hydrogenated at 200° C. over nickel. Eijkman (Chem. Weekblat. 4, 191 (1907)) similarly noted the production of phthalide under these conditions. In 1918 Willstätter and Jaquet (Ber. 51, 767 (1918)) carried out the hydrogenation of phthalic anhydride, using a platinum catalyst, and noted in addition to phthalide the production of appreciable quantities of hexahydrophthalide, hexahydro-o-toluic acid and hexahydrophthalic acid. German Patent 368,414 (1923) to Lucius and Bruning discloses the hydrogenation of phthalic anhydride with nickel at 190° C., using as solvents tetrahydronaphthalene, cyclohexanol, naphthalene or phthalide. The production of by-products is not noted. This patent also discloses the hydrogenation of tetrachlorophthalic anhydride to tetrachlorophthalide.

This invention has as an object a new process for the catalytic hydrogenation of anhydrides of dibasic acids to the corresponding lactones. A further object of this invention is to develop an improved process for the manufacture of phthalide. A still further object of the invention is to discover the most suitable solvents for the catalytic hydrogenation of phthalic anhydride to phthalide.

It has been found that phthalic anhydride may be smoothly hydrogenated with nickel catalysts to give good yields of phthalide when esters derived from lower monohydric aliphatic alcohols by esterification with lower fatty acids are utilized as solvents for the reaction.

The method developed for the preparation of phthalide consists in charging an autoclave suitably equipped for agitation with phthalic anhydride, the prescribed solvent, and a nickel catalyst, suitably a freshly reduced nickel-on-kieselguhr catalyst or other highly active nickel catalysts, as will be described hereinafter. Hydrogen is introduced into the autoclave until the pressure reaches the prescribed point, and it is then maintained at this point for the duration of the run, while heat is applied as indicated. At the completion of the run, the mixture is filtered to remove the catalyst and if necessary benzene is added to facilitate the filtration. The benzene solution is then washed with a 10% sodium carbonate solution until neutral. The carbonate solution is separated and acidified to give the acidic material, o-toluic acid. Pure phthalide is recovered by evaporation of the organic solvent.

A catalyst suitable for the hydrogenation of phthalic anhydride or equivalent anhydrides may be prepared from the elements in the ferrous group of metals, i. e., iron, cobalt, or nickel. This is the preferred group of elements from a practical standpoint although suitable catalysts may be prepared also from copper, cadmium or tin, either alone or in combination with chromium oxide. The following examples will serve to show the manner used in preparing a suitable catalyst, the catalytic element in this case being nickel.

A quantity of metallic nickel was dissolved in a mixture of equal parts by weight of 70% nitric acid and water. The solution was filtered and diluted with water to approximately twice its original volume. To the mixture was then added a quantity of kieselguhr weighing 10% more than the original nickel used. A solution of sodium bicarbonate (approximately 6% strength) was added to the nickel nitrate-kieselguhr mixture with vigorous stirring and in sufficient quantity to precipitate all of the nickel. The resulting precipitate was washed thoroughly with cold water, filtered, dried and reduced with hydrogen at 450° C.

Catalyst supports other than kieselguhr may be used, for example, carbon, alumina, magnesia, charcoal, pumice, asbestos, or quartz. The free metal itself may be used with no supporting material, although such a catalyst, unless specially prepared, is liable to be less durable.

A preferred nickel catalyst is prepared by digesting a nickel-aluminum alloy with sodium hydroxide according to the Raney method as described in U. S. Patent 1,628,190.

The processes of the present invention are illustrated by the following examples:

Example I

In a high-pressure autoclave there was charged 2270 g. of phthalic anhydride, 4000 cc. of ethyl butyrate and 250 g. of nickel powder catalyst. The mixture was heated under a hydrogen pressure of 1400 pounds per square inch and hydrogen absorption started at 125° C. Heating was continued and the temperature rose to a maximum of 180° C., but was maintained at 150° C. thereafter. On completion of the hydrogenation the mixture was filtered to remove the catalyst and the solvent was eliminated by distillation. The residual hydrogenated material was fractionated and the product solidified on cooling. It was recrystallized twice from alcohol and 1430 g. of pure phthalide was obtained.

Example II

One hundred grams of phthalic anhydride, 100 g. of ethyl acetate and 10 g. of nickel-on-kieselguhr catalyst were hydrogenated at 140° to 160° C. under a hydrogen pressure of 700 to 1400 pounds per square inch. The reaction was complete in 1.5 hours and the ethyl acetate solution was filtered to remove the catalyst. The solution was then extracted with aqueous sodium carbonate solution until neutral, and the carbonate solution was separated and acidified to give the acidic material. Phthalide was obtained by evaporation of the ester solvent. There was thus obtained 63 g. of phthalide (69.5% of theoretical) and 18 g. of o-toluic acid (19.5% of theoretical).

Example III

One hundred grams of phthalic anhydride, 100 g. of butyl acetate, and 10 g. of nickel-on-kieselguhr catalyst were hydrogenated at 150° to 160° C. under a hydrogen pressure of 1500 to 2500 pounds per square inch. After completion of the reaction, which required 2.25 hours, the solution was filtered. A small amount of benzene was added, and the organic solution was extracted with 10% sodium carbonate solution until neutral. The products were isolated as described in Example II and there was obtained 64 g. of phthalide (70.8% of theoretical) and 20 g. of o-toluic acid (21.8% of theoretical).

Example IV

One hundred grams of phthalic anhydride, 100 g. of butyl acetate, and 10 g. of nickel-on-kieselguhr catalyst were hydrogenated exactly as described in Example III, except that the hydrogen pressure used was 1000 to 1500 pounds per square inch. The products obtained were phthalide, 62 g. (68.5% of theoretical) and o-toluic acid, 15 g. (16.3% of theoretical).

Example V

One hundred grams of phthalic anhydride, 100 g. of ethyl butyrate, and 10 g. of nickel-on-kieselguhr catalyst were hydrogenated at 200° C. under a hydrogen pressure of 400 to 800 pounds per square inch. The catalyst was removed by filtration and the solvent was steam distilled. Benzene was added to the residue and the solution was extracted with aqueous sodium carbonate as usual. There was obtained 65 g. of phthalide (71.7% of theoretical) and 15 g. of o-toluic acid (16.3% of theoretical).

In the above examples, certain definite conditions of operation such as time, temperature and pressure have been indicated, but these may be varied within wide limits within the scope of the present invention. The preferred temperature for the process is the range from 100° to 200° C., but the temperatures above and below this may be used, although not so efficiently.

The preferred pressure for the process of the present invention lies within the range of 400 to 5000 pounds per square inch, but pressures of 1000 to 1500 pounds per square inch are usually the most suitable. The time of reaction is determined by the rate at which hydrogen is absorbed, which rate will vary depending on the temperature, pressure, catalyst, and anhydride being hydrogenated. An excess of hydrogen is usually employed. It may vary to as high as 1000% excess.

Although in the examples a liquid phase operation was disclosed, the invention is not limited to these conditions. Thus the process may be employed either in the liquid or in the vapor phase and may be operated either as a batch or a continuous process.

In the examples there are disclosed but a few selected ester solvents, but other solvents for the hydrogenation may be used. For example, I may use the esters of the lower monohydric aliphatic alcohols such as n-propanol, isopropanol, n-butanol, isobutanol, or any of the isomeric pentanols that have been esterified with any of the normal or branched chain aliphatic acids having from two to six carbon atoms.

The examples disclose the hydrogenation of phthalic anhydride, but other anhydrides represented by the general anhydride formula

may be hydrogenated by the process of this invention to corresponding lactones

where R in the above formula may be aromatic such as phenyl or naphthyl, or aliphatic such as $(CH_2)_n$ where $n$ equals 2, 3, or 4, or R may be a cycloalkyl ring as illustrated by cyclohexyl and cyclopentyl in hexahydrophthalic and camphoric anhydrides. Thus hexahydrophthalic anhydride gives hexahydrophthalide. Furthermore, when R is aromatic this nucleus may contain other substituent groups as, for example, alkyl groups exemplified by anhydrides of 3- and 4-methyl-o-phthalic and 3,6-di-methylphthalic acids which would give the corresponding methylated phthalides. While I prefer to use anhydrides of the above general formula in which the parent carboxyl groups of the anhydride are attached to adjacent carbon atoms in the R group as in the anhydrides of o-phthalic and hexahydro-o-phthalic acids, I may also use certain anhydrides in which the parent carboxyls are not in adjacent positions as in camphoric anhydride and 1,8-naphthalic anhydride.

Certain anhydrides of dibasic acids when heated form the anhydride readily at temperatures within the temperature range indicated for the hydrogenation of the anhydride. In such cases the hydrogenation of the acids themselves may be carried out in lieu of the anhydride and the process is to be regarded as falling within the scope of the invention.

Phthalide and substituted phthalides are of interest generally as plasticizers. They are of further interest as intermediates in the preparation of dyes, pharmaceuticals, parasiticides, plasticizers and resins.

When one considers the prior art, it is easily seen that two definite positions are extant. Either the investigator has claimed a quantitative yield of phthalide or else he has found the reaction to be complex with a number of products formed in addition to phthalide. Among these by-products I may mention o-toluic acid, hexahydrophthalide, hexahydro-o-toluic acid, and toluene. Repetition of experiments supposed to give quantitative yields of phthalide has shown that actually only low yields (30 to 50%) of this material are produced; o-toluic acid and phthalic acid are the chief by-products. These findings are corroborated by those investigators who have attempted to isolate all of the products of the reaction. However, if one uses as a solvent for the reaction the esters of the lower monohydric aliphatic alcohols with the lower fatty acids, phthalide is produced in a good yield (65 to 75% of theoretical) and the only by-product obtained is o-toluic acid. Furthermore, the use of these solvents allows the ready separation and isolation of the product formed. Other advantages of this invention are found in the relatively low temperature and low pressure at which the hydrogenation may be carried out, which obviates the necessity of using the special equipment necessary to produce and maintain extremely high temperatures and pressures.

As many apparently widely different embodiments of this invention may be made without departing from the spirit and scope thereof, it is to be understood that I do not limit myself to the specific embodiments thereof except as defined in the appended patent claims.

I claim:

1. In the process of catalytically hydrogenating an anhydride of the general formula

to a corresponding lactone of the general formula

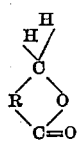

where R is a radical selected from the group consisting of phenylene, homologs of phenylene, naphthylene, hexahydrophenylene, 1,1,5-trimethyl cyclopentylene (2,5) and $(CH_2)_n$, where "$n$" is from 2 to 4, inclusive, the improvement which comprises carrying out the catalytic reaction in the liquid phase in the presence of an ester derived from a lower monohydric aliphatic alcohol esterified with a lower fatty acid.

2. The process in accordance with claim 1 characterized in that the ester is derived from a lower monohydric aliphatic alcohol having from two to six carbon atoms.

3. The process in accordance with claim 1 characterized in that the ester of the lower monohydric aliphatic alcohol is an ester of a fatty acid having from two to six carbon atoms.

4. In the process of catalytically hydrogenating phthalic anhydride to phthalide, the improvement which comprises carrying out the catalytic reaction in the liquid phase in the presence of an ester of a lower monohydric aliphatic alcohol esterified with a lower fatty acid.

5. The process in accordance with claim 4 characterized in that the ester is butyl acetate.

6. The process in accordance with claim 4 characterized in that the ester is ethyl butyrate.

7. The process in accordance with claim 4 characterized in that the ester is ethyl acetate.

8. A process for the hydrogenation of phthalic anhydride to phthalide, which comprises reacting hydrogen and phthalic anhydride dissolved in an ester of a lower monohydric aliphatic alcohol of two to six carbon atoms esterified with a lower fatty acid having from two to six carbon atoms in the presence of a nickel catalyst, under a pressure between 400 and 5000 pounds per square inch, and at a temperature between 100° and 200° C.

ARTHUR W. LARCHAR.